Oct. 10, 1967  R. E. MILLER ETAL  3,345,997
CHEMICAL PROPORTIONING DEVICE AND THE LIKE
Filed Sept. 16, 1966  4 Sheets-Sheet 1

INVENTORS.
ROY E. MILLER,
EARL R. MOWERY,
BY
Berman, Davidson & Berman
ATTORNEYS.

Oct. 10, 1967  R. E. MILLER ETAL  3,345,997
CHEMICAL PROPORTIONING DEVICE AND THE LIKE
Filed Sept. 16, 1966  4 Sheets-Sheet 2

FIG. 3.

INVENTORS.
ROY E. MILLER,
EARL R. MOWERY,
BY
Berman, Davidson & Berman
ATTORNEYS.

Oct. 10, 1967    R. E. MILLER ETAL    3,345,997
CHEMICAL PROPORTIONING DEVICE AND THE LIKE
Filed Sept. 16, 1966    4 Sheets-Sheet 3

INVENTORS.
ROY E. MILLER,
EARL R. MOWERY,
BY
Berman, Davidson & Berman
ATTORNEYS.

Oct. 10, 1967   R. E. MILLER ETAL   3,345,997
CHEMICAL PROPORTIONING DEVICE AND THE LIKE
Filed Sept. 16, 1966   4 Sheets-Sheet 4

INVENTORS.
ROY E. MILLER,
EARL R. MOWERY,
BY
Berman, Davidson & Berman
ATTORNEYS.

United States Patent Office 3,345,997
Patented Oct. 10, 1967

3,345,997
CHEMICAL PROPORTIONING DEVICE AND THE LIKE
Roy E. Miller, 1301 Stuart Drive, and Earl R. Mowery, 109 E. Locust St., both of Mechanicsburg, Pa. 17055
Filed Sept. 16, 1966, Ser. No. 579,941
9 Claims. (Cl. 137—99)

ABSTRACT OF THE DISCLOSURE

Means for mixing solutions in predetermined proportions comprising a mixing chamber; pump means for each of two fluids to be mixed, said pump means feeding said mixing chamber; and a liquid pressure responsive device in said mixing chamber for activating said pump means responsive to demand in said chamber.

---

This invention relates to a chemical proportioning device and, more specifically, the invention pertains to a device or apparatus for automatically and sequentially admixing a given quantity of a first liquid with a given quantity of another liquid at regularly spaced intervals of time.

The apparatus or device according to this invention finds particular utility in incorporation in a water distribution system as means to effect the purification thereof, although it will become readily apparent that the device or apparatus may find ready acceptance in systems other than that specifically mentioned supra, and wherein it is desired to mix two different liquids in selected proportions while at the same time permitting a regular outflow of the mixture of the two liquids to a location remote from the device or apparatus.

Briefly summarizing, the invention has, as one of its main objects, the provision of a mixing chamber which receives therein fixed and predetermined volumes of two different and unmixed fluids which are pumped from a common pumping unit to a separate mixing chamber by pumping means disposed within the unit, the control of the latter being effected by a liquid pressure-responsive device operable in response to a predetermined liquid pressure derived as the sum of the total weights of the two liquids as the same mix and accumulate in the mixing chamber in which the pressure-responsive device is disposed. While in the environment of the instant invention it is proposed to connect this device in a water system to effect the chlorination thereof, the obvious advantages of the incorporation of this apparatus in systems other than that to which reference has been made will become readily apparent to one skilled in these arts.

Another object of this invention is to provide a device or apparatus of the type generally described above, the device being non-complex in construction and assembly, inexpensive to manufacture and maintain, and which is durable in use.

Other and further objects and advantages of the instant invention will become more manifest from a consideration of the following specification when read in conjunction with the annexed drawings, in which:

Referring now more specifically to the drawings, reference numeral 20 designates a chemical proportioning device or apparatus constructed in accordance with the teachings of this invention and wherein the device or apparatus is constructed in such manner as to deliver or introduce a fixed predetermined volume of two mixed liquids into a fluid distribution system. Thus, as is seen in the several figures of the drawings, the device or apparatus 20 is seen to comprise a two-piece unit which includes a normally horizontal substantially rectangular base support member 22 common as a support to the two units 24, 26 (see FIGURE 3) although this is an optional feature.

Figure 2:
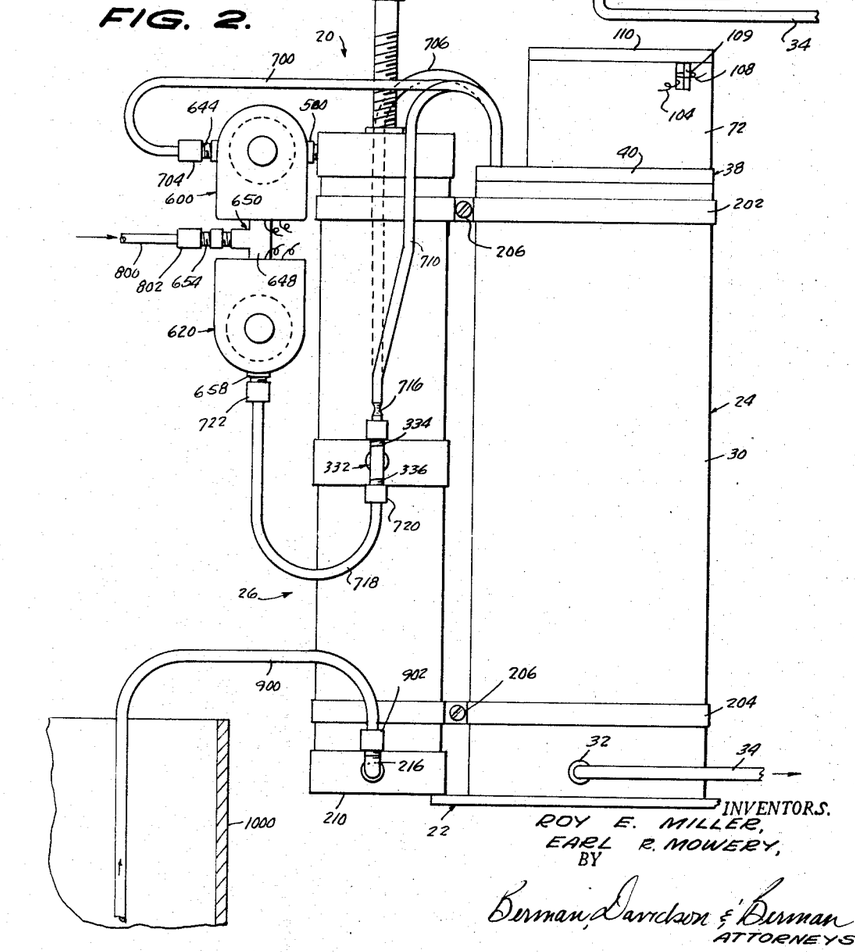
FIGURE 2 is a side elevational view thereof.

The base support member 22 (see FIGURES 3 and 4) is integrally-formed with a raised cylindrical neck 28 which telescopically receives thereover the lower end of a vertically-elongated substantially hollow cylindrical housing 30, the housing 30 being in abutting relationship relative to the base member 22 and sealed therewith. Reference numeral 32 indicates a conventional fluid coupler fitting (see FIGURE 2) communicating at one of its ends with the lower end of the interior of the housing 30, the other end of the coupler fitting 32 being connected to one end of a feeder conduit 34 having its other end adapted for connection to a fluid distribution system (not shown). It will be understood that the inner end of the coupler fitting 32 opens into the housing 30 above the neck 28, and that the conduit 24 may have a manually-operable valve 36 (see FIGURE 10) connected therein if desired.

Figure 3:
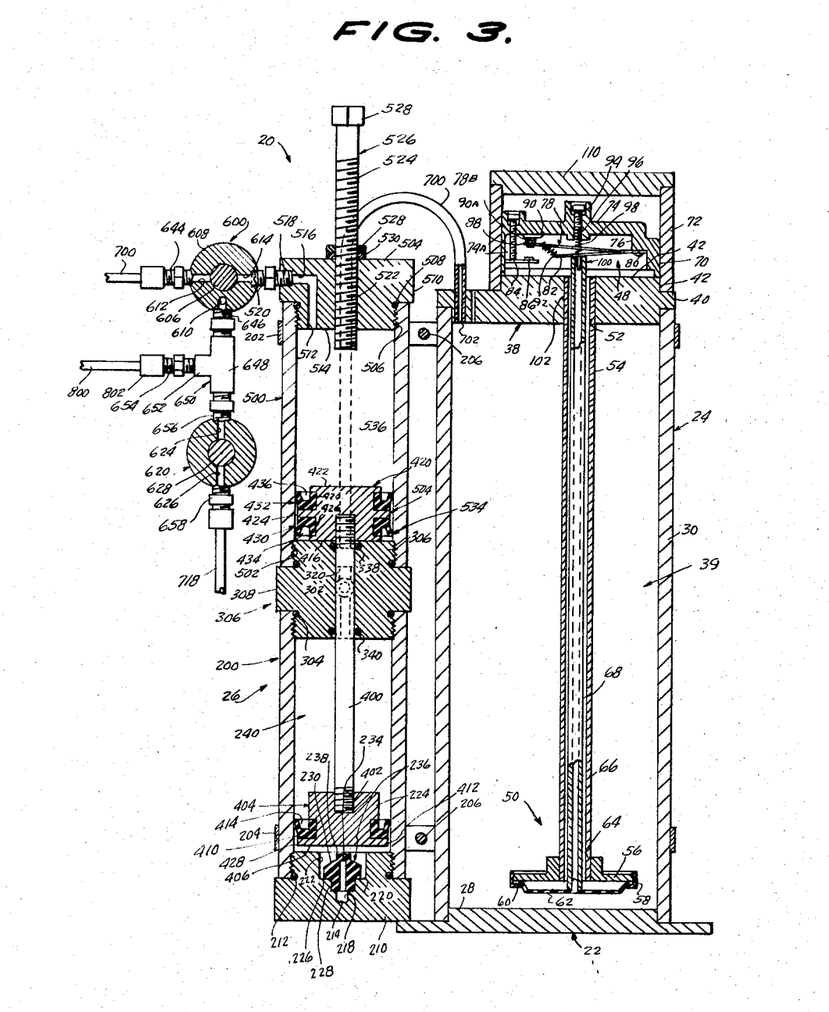
FIGURE 3 is a detail medial transverse cross-sectional view of the two-piece unit of the device or apparatus, FIGURE 3 being taken substantially on the vertical plane of line 3—3 of FIGURE 1, looking in the direction of the arrows and showing the electrical control switch for the device or apparatus in closed position and with the pumping pistons disposed in one extreme position of their stroke.
Figures 4, 5:
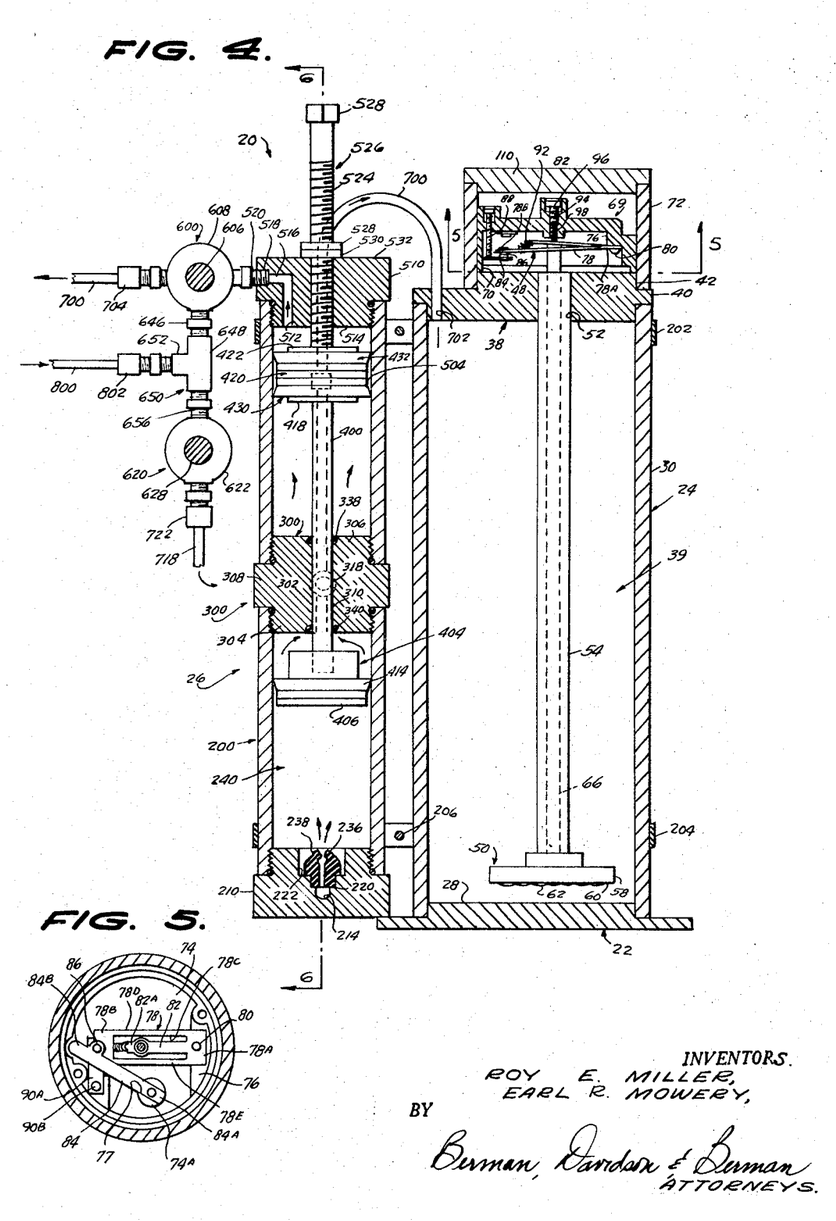
FIGURE 4 is a cross-sectional view similar to FIGURE 3, but showing the control switch in its open position and the pistons moved to a second extreme position.
FIGURE 5 is a bottom plan view of the electrical switch box and its associated switch.

Reference numeral 38 denotes an upper cylindrical cap for the upper end of the housing 30, the cap 38 being telescopically engaged within the upper end of the housing 30 and includes a peripheral flange 40 disposed in sealing engagement with the upper end of the housing 30 and against which it abuts to limit the downward movement of the cap 38 relative to the housing 30. Projecting upwardly from the upper exterior end of the cap 38 and integral therewith is a substantially cylindrical throat 42 eccentrically-located thereon. As is seen in FIGURES 3 and 4, the cap 38, the base member 22 and that portion of the housing 30 extending therebetween define a liquid-mixing chamber 39 to which further reference will be made below.

The cap 38 serves as mounting means for an electrical switch 48 which is controlled by fluid pressure-responsive apparatus indicated by reference numeral 50. To this end, the throat 42 is formed with a coaxial passage 52 which extends transversely therethrough and through the cap 38 to open, respectively, into the plane of the upper end of the throat 42 and the plane of the underside of the cap 38. Fitted and sealed within the passage 52 is the upper end of a first elongated substantially hollow rigid tubular element 54, the other end of the element 54 depending from the cap 38 into the mixing chamber and terminating at a point spaced from but proximate to the upper end of the neck 28. The upper end of the element 54 is substantially flush with the plane of the upper end of the throat 42 as is seen in FIGURE 4 of the drawings.

Telescoped over and fixedly-secured to the lower free end of the first tubular element 54, which depends into the housing 30, is a discoidal plate 56 (see FIGURE 3) fixedly-secured thereto by conventional means (not shown) and to the circumferential edge of the discoidal plate 56 is secured a cylindrical flange 58 integrally-connected to an inwardly-extending annular jaw 60. The peripheral marginal edge of a flexible imperforate cylindrical diaphragm 62 is clampingly-engaged between the jaw 60 and an adjacent confronting portion of the discoidal plate 56.

Projecting centrally from the diaphragm 62 is a boss 64 serving as guide and anchor means for one end of a second elongated substantially rigid hollow tubular element 66 which telescopes over the boss 64 to seat against an adjacent portion of the inner side of the diaphraghm 62. As is seen in FIGURES 3 and 4, the outside diameter of the second or inner tubular element 66 is appreciably less than the inner diameter of the first or outer tubular element 54 to provide an annular working space 68 therebetween. From FIGURE 3 it is seen that the upper terminal end of the second or inner tubular element 66 is disposed above the plane of the upper side of the throat 42 to serve a function to be described.

As has been stated above, the fluid or liquid pressure-responsive means 50 is adapted to control the operation of the electrical switch designated by reference numeral 48, and while this switch is of conventional structure, a brief description of the component elements thereof and its operation is deemed to be in point at this time. Thus, the switch 48 is seen to include a substantially hollow cylindrical switch box 69 formed of an electrically-insulating rigid material, the box 69 having a substantially cylindrical sidewall 70 (see FIGURES 3 and 4) which is provided with an open lower end that seats against the circumferential marginal edge of the upper side of the throat 42. Means, not shown, conventional with this type of switch are employed to releasably-secure the switch box 69 in its connected position on the throat 42. As is seen in the last two named figures, the sidewall 70 is encased or telescoped within a vertically-elongated substantially hollow cylindrical open-ended sleeve 72 having its lower end telescoped over the throat 42 to seat and seal against the upper side of the cap 38.

The switch box 69 is provided with an integrally-formed upper end closure wall 74 joined at a peripheral marginal edge thereof with the sidewall 70 having a discontinuous offset downwardly-extending shoulder 76 which serves as a support for the fixed end of a compound substantially rectangular metallic switch arm 78 (see FIGURES 3 and 5). The switch arm 78 has its fixed end 78A connected by conventional means 80 to the underside of the shoulder 76, the other or free end 78B of the switch arm 78 being slotted as at 78C to form a pair of laterally-spaced and substantially parallel side arms 78D, 78E at the sides of the slot 78C, and an intermediate lever 82 having an end integral with the fixed end 78A and with its free end 82A being juxtaposed but spaced inwardly from the free end 78B of the switch arm 78. The switch arm 78 and its associated lever 82 are formed of relatively thin flexible sheet metal to provide, in the environment to be described, a snap-action electrical switch.

Fixedly-secured to the underside of a cylindrical stud 74A depending from the closure wall 74 as by means 77 (see FIGURE 5) and projecting inwardly therefrom in the direction of the free end 78B of the switch arm 78 is one end 84A of a flexible metallic platform 84 carrying at its free end 84B a fixed switch contact 86 disposed in the path of movement of the free end 78B of the switch arm 78. Threaded through the closure wall 74 is an externally-adjusatble adjustment screw 88, the free end of the latter engaging the free end 84B of the platform 84. The fixed switch contact 86 is positioned below and in confronting relation relative to the free end 78B of the switch arm 78 and is biased for movement in that direction against the holding force of the screw 88.

Fixedly-secured to the underside of the closure wall 74 is a second fixed switch contact 90 also disposed in the path of movement of the free end 78B of the switch arm 78 at the other or upper side thereof and disposed in spaced confronting relation relative to the contact 86. The free end 78B of the switch arm 78 is normally in alternate engagement with one or the other of the fixed switch contacts 86, 90, respectively, but for the usage of the switch 48 in conjunction with cooperating elements of the device, the switch contact 86 may be considered as being merely abutment means and for all intents and purposes, the switch 48 may be considered as being a single-pole single-throw switch.

Tthe lever 82 is of lesser length than the switch arm 78 and the free end 82A works in the slot 78C. The free end 82A is connected with one end of a helicoidal spring 92 under tension, the other end of the spring 92 being connected to the free end 78B of the switch arm 78 intermediate the arms 78D, 78E, whereby as the free end 82A of the lever 82 passes from one side of the switch arm 78 to the other (see FIGURES 3 and 4), the free end 78D of the switch arm 78 snaps in the reverse direction in and out of engagement, alternately, with the contacts 86, 90, respectively.

Extending substantially centrally through the closure wall 74 and transversely thereof is a spring tension-adjustment screw 94, the screw 94 being partially threaded into the upper end of a transverse bore 96 in which is seated the upper end of an elongated helicoidal spring 98, the lower end of the latter bearing against the upper side of the lever 82 under compression. The lower end of the spring 98 is connected to the upper end of a spider 100 (see FIGURE 3) which, in turn, bears against the underside of the lever 82 and which is formed with a plurality of downwardly-extending flexible and diverging wire fingers 102 which frictionally-engage and are retained within the upper end of the second tubular member 66, the fingers supporting the tubular element 66 with the upper end thereof engaging against the underside of the lever 82 with which it constantly maintains contact. The tubular element 66 is thus held in substantially concentric relation relative to the element 54, but is permitted some lateral movement in the annulus 68.

Figure 1:
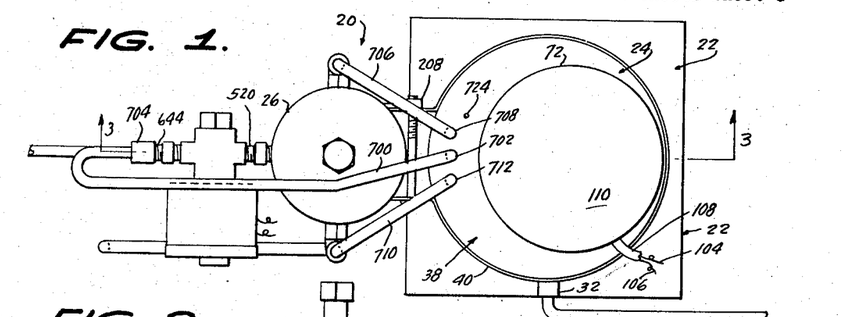
FIGURE 1 is a top plan viewing of a mixing device constructed according to this invention.

It will be understood that suitable provision is made on the switch box 69 to provide electrical connection of wires 104, 106 (see FIGURE 10) with the switch arm 78 at its fixed end 78A and with the fixed switch contact 90, respectively, the wires 104, 106 forming a cable 108 (see FIGURE 1) which is led through a suitable slot 109 formed in the sleeve 72.

A suitably fitted seal 110 closes the upper end of the sleeve 72 in vertically-spaced relation relative to the switch box 69.

The unit 26 comprises a vertically-elongated substantially hollow cylindrical first casing 200 releasably-connected adjacent its upper and lower ends to the housing 30 by upper and lower endless clamping bands 202, 204, respectively, the connections being effected by the clamp bolts and nuts 206, 208, respectively. As is seen in the several figures of the drawings, the bolts 206 pass between the housing 30 and the unit 26 to cause the bands 202, 204 to effect connection of the housing 30 and the unit 26 in spaced relation relative to one another while preferably maintaining their respective longitudinal axis in parallelism. The lower end of the casing 200 is closed by a threaded first plug 210 fitted with a conventional ring seal 212. Preferably, but not essential for the optimum working conditions of the device or apparatus 20, the plug 210, when fitted to the casing 200 and with the unit 26 clamped to the casing 30 in the manner described above, preferably seats and abuts against the base member 22. The plug 210 is formed with a radial passage 214 having a tapped opening 215 at the outer end thereof which is fitted with one end of an elbow connector 216 to which further reference will be made, infra.

Figure 6:
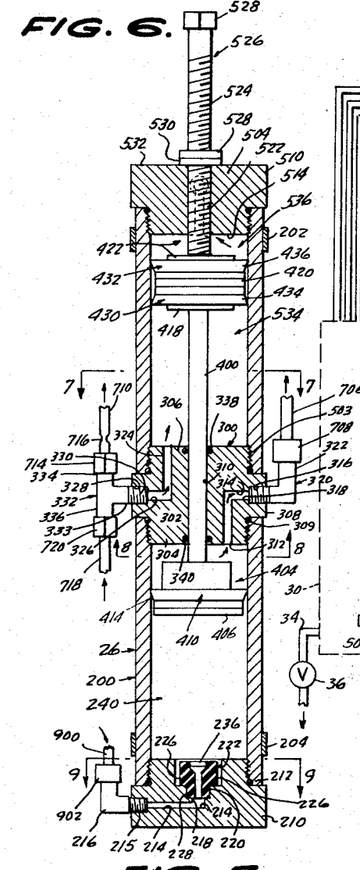
FIGURE 6 is a medial transverse detail cross-sectional view, FIGURE 6 being taken on the vertical plane of line 6—6 of FIGURE 4, looking in the direction of the arrows.
Figure 7:
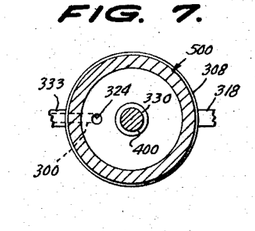
FIGURE 7 is a transverse cross-sectional view, FIGURE 7 being taken substantially on the horizontal plane of line 7—7 of FIGURE 6, looking in the direction of the arrows.
Figure 8:
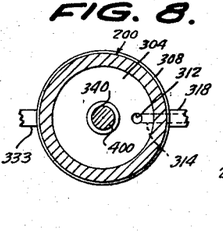
FIGURE 8 is a transverse cross-sectional view, FIGURE 8 being taken substantially on the horizontal plane of line 8—8 of FIGURE 6, looking in the direction of the arrows.

The centrally-located end of the passage 214 opens into one end of a coaxially-located (relative to the plug 210) upright bore 218 which is counterbored at 220 and again at 222, see FIGURES 3 and 6.

At 224 is generally designated a conventional lip valve formed of a suitable flexible plastic material and having a cylindrical substantially solid main body portion 226 which, due to its bulk, is semi-rigid. From the lower side of the main body portion laterally projects, in coaxial relation relative thereto, an axially-elongated cylindrical neck 228 that is seated within and fixedly-secured within the counterbore 220, the main body portion 226 being disposed within the counterbore 220 in concentrically-spaced relation relative thereto and having a coaxial bore 229 therethrough.

Figure 9:
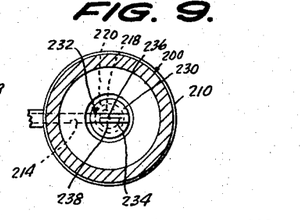
FIGURE 9 is a transverse cross-sectional view, FIGURE 9 being taken substantially on the horizontal plane of line 9—9 of FIGURE 6, looking in the direction of the arrows.

The upper end 230 of the main body portion 226 has a substantially ogive configuration and adjacent its apex the end 230 terminates in a vertical diametrically-extending rib 232 (see FIGURE 9) having a diametric slit 234 formed therein that terminates intermediate the ends of the rib 232, the slit being in open communication with the upper end of the bore 229. The slit 234 gives rise to a pair of oppositely-disposed, parallel and confronting flexible lips 236, 238 which are normally biased for movement toward one another for surface-to-surface engagement with one another when the lip valve 224 is closed (see FIGURE 3). Preferably, the upper ends of the lips 236, 238 terminate substantially in the plane of the upper inner end of the first plug 210, although this is not a prerequisite for the efficient operation of the device 20, and the inner cylindrical space immediately above the upper inner end of the first plug 210 and within the casing 200 is herein designated as the first pumping chamber 240.

Reference numeral 300 connotes a substantially cylindrical divider wall having a main body portion 302 provided with opposed externally-located thread ends 304, 306, respectively, interrupted intermediate their adjacent ends by a laterally and outwardly-projecting circumferential flange 308, and as is seen in FIGURES 3, 4 and 6, the end 304 is threaded into the upper end of the first casing 200 whereby both ends of the unit 26 are closed. It will be understood from the drawings that the downward threaded movement of the main body portion 302 into the upper end of the casing 200 is limited by the sealing engagement of the flange 308 therewith, and this connection includes the interposed conventional O-ring seal 309.

As is seen in the several figures of the drawings, the divider wall 300 has appreciable axial length, and the main body portion 302 thereof is formed with a vertically-extending coaxial bore 310, the opposed ends of which open into the planes of the opposed ends of the divider wall 300.

The main body portion 302 is provided with a first passage 312 extending inwardly from the plane of the outer end of the divider wall end 304 (see FIGURE 6) and parallel to, but offset from the bore 310. The inner end of the first passage communicates with the inner end of the first radial bore 314 which, at its other end, opens into the inner end of an internally-threaded counterbore 316 extending through the flange 308 which, in turn, threadedly-receives at its outer end one end 318 of an elbow connector 320 to which further reference, and to its other end 322, will be made below.

This arrangement of the first passage and bore as provided in the main body portion 302 of the divider wall 300 is substantially duplicated at the diametrically-opposed side thereof wherein it is seen that a second passage 324 is formed in the main body portion 302, the passage 324 being substantially parallel to the bore 310 and the first passage 312 in offset relation with respect thereto, the second passage opening at one of its ends into the plane of the outer end 306 of the main body portion 302 and its other or inner end being in open communication with the inner end of a second radial bore 326 coaxially-disposed relative to the first bore 310. The second bore 326 opens at its other end into the cylindrical plane of the edge of the flange 308 via a threaded counterbore 328. The counterbore 328 threadedly-receives the threaded end of the stem 330 of a T-connector 332 having a crosshead including the open-ended arms 334, 336 to which further reference will be made.

Reference numerals 338, 340 designate upper and lower O-ring seals, respectively, fitted in suitable seats at the remotely-disposed ends of the divider wall 300 and adjacent the bore 310, the seals 338, 340 and the bore 310 slidably-receiving an elongated cylindrical piston rod 342 therethrough for reciprocation therein. The piston rod 400 is of such length as to extend beyond the opposed ends 304, 306 of the divider wall 300, and the lower end of the piston rod 400 is threaded (see FIGURE 3) at 402 centrally into a cylindrical piston 404 coaxially-disposed relative to the housing 200 and having its outer face 406 disposed in confronting relation relative to the inner end of the plug 210. The piston 404 is circumferentially-grooved at 408 to receive an upwardly-opening plastic flexible U-shaped piston ring 410 therein. The outside diameter of the piston 404 is smaller than the inside diameter of the first casing 200 to provide, constantly, as the piston 404 reciprocates, a clearance indicated at 412. On the other hand, the ring 410 has its outer flexible annular arm 414 in constant sealing and frictional contact with the inner side of the casing 200 on the suction side of the pump stroke cycle of the piston 404 and which, because of its flexibility, is movable away therefrom on the pressure side of the pump stroke cycle, all in the well-known and conventional manner. In the construction shown, the piston 404 is free to reciprocate in the chamber 240 between the plug 210 and the adjacent end 304 of the divider wall 300 which delineates the upper terminal end of the pumping chamber 240.

The other or upper end of the piston rod 400 is threadedly-connected at 416 to one end 418 of a second substantially cylindrical piston 420 having an opposed end 422. The piston 420, intermediate its lower and upper ends 418, 422, respectively, is provided with an outwardly-projecting integral cylindrical flange 424, and the piston 420 is further formed with a pair of annular lower and upper circumferential grooves 426, 428 separated by the flange 424. The grooves 426, 428 receive therein a flexible plastic substantially U-shaped piston ring 430, 432, respectively, inverted with respect to one another. Of these rings, the lowermost one 430 thereof is downwardly-opening and includes the outwardly-diverging flexible annular arm 434; and the uppermost one 432 of the rings opens upwardly and includes the outwardly-diverging flexible annular arm 436.

The piston 420 of the unit 26 is encased within a second vertically-elongated substantially hollow cylindrical casing 500 having opposed threaded upper and lower ends of which the lowermost one thereof is threaded down at 522 on the end 306 of the divider wall 300 to make sealing engagement with the peripheray flange 308, the connection including the conventional O-ring seal 503. The piston 420 vertically reciprocates within the casing 500 through fluid pressure-operating means to be described. As is clearly seen in FIGURES 3 and 6, the outside diameter of the flange 424 is smaller than the inside diameter of the casing 500 to constantly provide an annular clearance 504 therebetween, and the flexible annular flanges 434, 436 constantly maintain frictional contact with the inner side of the casing 500 since, for reasons to be made clear below, under their respective working strokes they remain under hydraulic pressure.

The upper end of the casing 500 is closed by a second cylindrical plug 504 threaded downwardly therein as at 506 in a junction including the O-ring seal 508. The plug 504 has a laterally-projecting cylindrical flange 510 serving as limit means therefor, and the plug 504 is formed with an offset vertical passage 512 opening at one of its ends in the plane of the underside 514 thereof, the other end of the passage 512 being in open communication with one end of a radially-extending passage 516 whose other end opens in the peripheral plane of the flange 510. Threaded into the outer end of the passage 516 in a countersunk bore 518 is one end of a conventional connector 520 to which further reference will be made below.

The second plug 504 is formed with a central transversely-extending internally-threaded bore 522 which threadedly-receives the threaded shank 524 of an elongated adjustment bolt 526 having an enlarged whench-receiving head 528. The bolt 526 extends on opposite sides of the second plug 504 and carries thereon a lock nut 528 under which is disposed a Teflon seal 530 adapted to be forced into sealing engagement with the upper side 532 of the plug 504 when the bolt 526 is moved to a selected adjusted position.

The piston 420, as it works in the casing 500, provides a pair of vertically-spaced constant-volume pumping chambers 534, 536, the chamber 534 extending between the upper end 306 of the divider wall 300 and the adjacent lower end 418 of the piston 420, and the chamber 536 being defined as the space extending between the upper end 422 of the piston 420 and the adjacent side 574 of the plug 504. As is seen in the several figures of the drawings, the inner end of the adjustment bolt 526 extends into the chamber 536 to engage the end 422 of the piston 420 on its upstroke, or as the end 422 approaches the underside 514 of the plug 504, thereby limiting the strokes of the pistons 404, 420 and adjustably-controlling the volumn of the chambers 534, 536 in accordance with the axial adjustment of the bolt 526.

Figure 10:
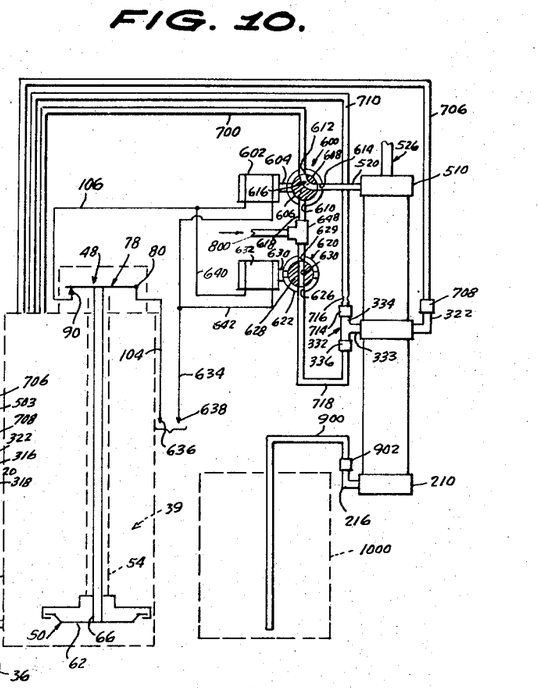
FIGURE 10 is a schematic electrical wiring diagram of the electrical control system for the mixing device, certain component elements thereof being illustrated in dotted lines.

At 600 is generally indicated an electromagnetically-operated three-way valve of conventional construction. The valve 600 is provided with the usual winding 602 and a reciprocable aramature 604 operatively-connected in the usual manner with a valve plug 606 rotatably-supported in a valve casing 608 having the conventional inlet port 610, the outlet port 612, and a combined inlet-outlet port 614. The valve plug 606 has formed therein a passage 616 as shown in FIGURE 10, establishing communication between the outlet port 612 and the port 614 which, under this condition, serves as an outlet port to serve a function to be described, and the valve plug 606 is also provided with a passage 618 closed to the inlet port 610 and to the inlet-outlet port 614 under the condition of the valve as is shown in FIGURE 10.

Upon energization of the winding 602, the valve plug 606 rotates moving the passage 616 out of communication with the ports 612, 614 and establishes communication between the inlet port 612 with the port 614, the latter then becoming an outlet port.

Reference numeral 620 indicates a second conventional electromagnetically-controlled valve having a casing 622 provided with an inlet port 624 and an outlet port 626. Rotatably-supported in the casing 622 is a valve plug 628 through which diametrically extends a passage 630 shown in FIGURE 10 as establishing direct communication between the ports 624, 626, the valve 620 being in its open position. Movement of the plug 626 to break this communication closes the valve 620.

All in the conventional manner, the plug 628 is operatively-connected to the armature 630 of the valve winding 632 of the electromagnetically-controlled valve 620 whereby energization of the winding 632 causes the armature to move to effect rotation of the plug 628 whereby the communication between the passage 630 and the ports 624, 626 is broken to effect a closing of the valve.

The two windings 602, 632 are connected in parallel with one another, as shown in FIGURE 10, the circuitry being therein illustrated as including the wires 104 and 634 which are, in fact, the mains, and which are connected at one of their respective ends 636, 638 with any desirable source of electrical circuit (not shown). The main 104 is connected in series with the switch arm 78 shown in FIGURE 10, and in this figure the switch arm 78 is shown as being closed against the fixed switch contact 90 which, in turn, connects through wire 106 with one side of the winding 602. The other side of the winding 602 connects directly to the other end of the main 634.

Lead 640 connects one side of the winding 632 with the wire 106 and lead 642 connects the other side of the winding with the main 634. Under the conditions of the shown circuitry, the windings are energized to obtain the shown positions in FIGURE 10 of the plugs 606, 628. Under conditions wherein the switch arm 78 is moved to its open position, the armatures are spring-biased in the well known manner to move in such direction as to cause the valve plugs 606, 628 to rotate simultaneously to their respective alternative positions described supra.

As is seen in FIGURE 3, the connector 520 has its other end connected to the port 614 and the outlet port 612 is connected to one end of a connector 644. To the inlet port 610 is connected one end of a connector 646, the other end of the connector 646 being connected to and in open communication with one end of a crosshead 648 of a T-coupler 650 having a stem 652 connected with a connector 654. The other end of the crosshead 648 connects through a connector 656 with the inlet port 624 of the valve 620. The outlet port 626 of the valve 620 is connected through the connector 658, the latter serving a function to be described.

Connection between the units 24, 26 is established by conduit means of which, reference being made to FIGURES 1, 2, 3 and 10, reference numeral 700 designates an elongated hollow tubular conduit having one of its ends fixedly-connected in a bore 702 which extends transversely through the cap 38 to open into the mixing chamber 39. The other end of the conduit 700 connects through a coupler 704 with the other end of the connector 644 (see FIGURES 1 and 3).

A conduit 706 has one of its ends entering the cap 38 at 708 for communication with the mixing chamber 39 in the same manner as the conduit 706, and the other end of the conduit 706 connects with the arm 322 via the coupler 708. Similarly, conduit 710 has one of its ends connected through the cap 38 as at 712, and its other end connects via a coupler 714 to the crosshead arm 334 of the T-connector 332. To serve a function to be described, the last-mentioned end of the connector 710 is crimped or otherwise provided with a restriction to provide resistance to fluid flow, and a conduit 718 connects at one of its ends through the coupler 720 with the other arm 336 of the T-connector 332, the other end of the conduit 718 connecting through coupler 722 with the other end of the connector 658.

In addition to the bores 702, 708 and 712 which extend transversely through the cap 38, the cap 38 is also formed with a transversely-extending vent passage 724 venting the mixing chamber 39 to the ambient atmosphere.

A conduit 800 has one of its ends connected to a source of liquid under pressure (not shown) such as, for example, well water or the water supply of an urban community or in the supply line of a residence of the community, the other end of the conduit connecting through the coupler 802 with the connector 654 of the stem 652 of the T-connector 650.

One end of a conduit 900 connects to a coupler 902, the other end of the conduit 900 being normally immersed in a liquid solution (not shown) which, in the environment of this invention, could comprise a chlorine solution. The solution is, of course, retained within a vessel 1000 in which the other end of the conduit is extended.

Having described and illustrated one embodiment of this invention in detail, the operation of the device or apparatus 10 is briefly set forth below, although the same is deemed to be self-evident from the preceding specification.

Let it be assumed that the device or apparatus 20 has been installed in a liquid distribution system (not shown) with the conduit 800 connected in the system to receive water under pressure therefrom. Let it further be assumed that the mains 104, 634 are connected with a suitable source of current and that both units 24, 26 are devoid of fluid, but that the vessel 1000 is substantially filled with a chlorine solution and that the aforementioned other end of the conduit 900 is immersed therein. Finally, let it also be further assumed that the valve 36, described as a manually-operated valve, but which could be electrically and automatically-controlled under other usages of this device 20, is open. Now, under these assumed conditions, the absence of any fluid in the mixing chamber 39 permits the diaphragm 62 to downwardly distend under the weight of the second tubular element 66 and the spring pressure bias of the spring 82 whereby the switch arm 78 is moved to cause the free end 78B thereof to close against the contact 90, thereby energizing the windings 602, 632 causing the armatures 604, 634 to move against spring tension and in such direction as to cause the valve plugs 606, 628 to rotate to their respective positions shown in FIGURE 10.

Water now flows from the conduit 800 through the valve 620 through the T-connector 650 and through the T-connector 332, wherein a part of the water flows through the stem 333 and through the bore 326 and passage 324 into the chamber 534 below the piston 420, thereby forcing the latter to move upwardly from its position shown in FIGURE 3 to its positions shown in FIGURES 4 and 6. Simultaneously, a part of this water flow is diverted through and beyond the construction 716 formed in the conduit 710, and this divided portion of the water under pressure is discharged into the mixing compartment 39.

As the piston 420 raises in the casing 500 of the unit 26, the piston 404 is also moved upwardly in the pumping chamber 240 simultaneously therewith to create a partial vacuum in the chamber 240 causing the chlorine solution in the vessel 1000 to be drawn upwardly through the conduit 900 and past the lips 236, 238 which open away from one another under the fluid pressure of the chlorine solution in order to admit this solution to the pumping chamber 240.

The condition of the device 20 now remains static until the stand of water in the mixing chamber accumulates therein to such an extent as to cause the pressure thereof to exert an upward force on the underside of the diaphragm 62 sufficient to overcome the downward force exerted by the tubular element 66 thereon. The upward movement of the tubular element 66 causes the switch arm 78 to pivot downwardly, thereby breaking the contact of the free end 78B with the fixed switch contact 90, thereby de-energizing the windings 602, 632, whereupon the valve plugs 606, 628 rotate to the second of their aforedescribed positions.

In its second position, the valve 620 is closed cutting off the supply of water from the conduit 800 to the conduit 718 and stopping the flow of water through the T-connector 332. In the second position of the valve plug 606, water under pressure now passes through the conduit 800, the T-connector 648, the inlet port 610 of the valve 600, the valve plug passage 618 and to the now outlet port 614. From the outlet port 614 this water flows through the coupler 520, the passages 516 and 512 and into the pumping chamber 536 to exert a force on the upper end 422 of the piston 420, this force now driving the piston 420 downwardly from its uppermost position shown in FIGURES 4 and 6, to its lower position shown in FIGURE 3.

As this action takes place, the water in the pumping chamber 534 is now forced therefrom by the piston 420 and flows through the passage 324 and bore 300 and is expelled therefrom to pass through the T-connector 332. Due to the rotation of the valve plug 606, this water cannot flow through the conduit 718, but is now forced to pass the constriction or metering device 716 formed in the conduit 710, and from this conduit 710 the expelled water is discharged into the mixing chamber 39.

Simultaneously with the downward movement of the piston 420, the piston 404 is also forced downwardly in its pumping chamber 240, the movement of this piston causing the chlorine solution drawn into the pumping chamber 240, in the manner above-described, to compress the arm 414 of the piston ring 410 inwardly to flow therepast whereby the chlorine solution accumulates in the pumping chamber 240 on the opposite or upper side of the piston 404.

Assuming that the valve 36 is open, the water accumulated in the mixing chamber 39 will now be discharged through the conduit 34 and into the fluid distribution system or other desirable outlet.

As the water leaves the mixing chamber 39, the pressure it exerts on the underside of the diaphragm 62 gradually diminishes until the pressure of the biasing spring 98 exerted on the tubular element 66 and the weight thereof is sufficient to cause the diaphragm to distend downwardly, thereby causing the lever 82 to move downwardly (from its position shown in FIGURE 4 to its position shown in FIGURE 3) thereby re-establishing contact of the free end 78B of the switch arm 78 with the fixed switch contact 90 and closing the circuits to the windings 602, 632 whereby the armatures 604, 630 of the valves 600, 620, respectively, are again actuated to cause the valve plugs 606, 628 to return to the position shown in FIGURE 10.

As water now flows from the conduit 800 through the valve 620, conduit 718, the T-connector 332 and the stem 333, this water passing through the bore 300 and passage 324 will again act upon the underside 418 of the piston 420 and will cause the water accumulated in the pumping chamber 536 to be expelled therethrough through the connector 520, the valve 600 and conduit 700 for discharge in the mixing chamber 39. Simultaneously, a metered amount of the water flowing through the T-connector 332 will also pass through the conduit 710 for discharge into the mixing chamber 39.

On this second upward stroke of the piston 420, the piston 404 will also be moved upwardly, and in this instance, the chlorine solution now occupying the pumping chamber 240 above the piston 404 will be expelled through the passage 312, the bore 314, the connector 320 and its associated conduit 706 and will discharge into the mixing chamber 39.

It will now be understood that a predetermined volume of chlorine solution has been transferred from the pumping chamber 240 to the mixing chamber 39, and that no upward movement of the diaphragm 62 will take place until the pressure exerted by the chlorine solution, the water which has been forced from the pumping chamber 536, and the water which continues to flow through the conduit 710 accumulates to exert a force on the diaphragm 62 sufficient to overcome its weight and the force exerted by the spring 98 whereby the lever 82 is again forced to move from its position shown in FIGURE 3 to its position shown in FIGURE 4, whereby the electrical circuit to the windings 602, 632 is again broken enabling the valve plugs 606, 628 of the valves 600, 620, respectively, to move to their aforedescribed second positions after which this cycle of operation may be indefinitely repeated.

The several adjustments provided in this device afford the user fine control over the device or apparatus 20. For example, adjustment of the bolt 526 upwardly or downwardly in the threaded bore 522 will adjust the stroke of the pistons 420 and 404 whereby an exact proportion of chlorine solution relative to the water supplied for mixture thereto may be obtained, and adjustment of the screw 94 affords still another control therefor.

Having described and illustrated one embodiment of this invention in detail, it will be understood that the same is offered merely by way of example, and that this invention is to be limited only by the scope of the appended claims.

What is claimed is:

1. Means for admixing fluids in predetermined volumetric proportions relative to one another and comprising independent pump means for, respectively, each of said fluids, first means connecting each of said pump means with a separate fluid source and with the inlet port of its respective pump means, said first means including actuating means for each of said pump means, a mixing chamber, and second means connecting said mixing chamber with an outlet port of each of said pumps, and fluid pressure-responsive control means disposed in said mixing chamber operably-connected with said actuating means to control the latter in response to fluid pressure within said mixing chamber, wherein one of said fluids is under pressure and each of said pump means is simultaneously operated in response to the pressure exerted by said one fluid on its associated pump means.

2. Means for admixing fluids as defined in claim 1 wherein said actuating means comprises valve means interposed between said mixing chamber and said pump means.

3. Means for admixing fluids in predetermined volumetric proportions relative to one another and comprising independent pump means for, respectively, each of said fluids, first means connecting each of said pump means with a separate fluid source and with the inlet port of its respective pump means, said first means including actuating means for each of said pump means, a mixing chamber, and second means connecting said mixing chamber with an outlet port of each of said pumps, and fluid pressure-responsive control means disposed in said mixing chamber operably-connected with said actuating means to control the latter in response to fluid pressure within said mixing chamber, wherein one of said fluids is under pressure and said pump means is compound and comprises a casing, means extending transversely of said casing dividing said casing into a plurality of separate pumping chambers, a pumping piston disposed in each of said pumping chambers, means connecting each of said pistons for simultaneous recirocable movement with one another in their respective pumping chambers, first conduit means connecting each of said fluid sources with their respective pumping chambers, second conduit means connecting said pumping chamber with said mixing chamber, said valve means being connected in said first conduit means, and said valve means being operable in response to said fluid pressure-responsive means as said fluids are pumped into and accumulate in said mixing chamber.

4. Means for admixing fluids as defined in claim 3 wherein said actuating means includes an electric circuit having a control switch connected therein and electrically-controlled valve-operating means responsive to the condition of energization and de-energization of said circuit, and means operably-connecting said switch with said fluid pressure-responsive means to effect the closing and opening of said switch and consequently said energization and de-energization of said circuit.

5. Means for admixing fluids in predetermined volumetric proportions relative to one another and comprising independent pump means for, respectively, each of said fluids, first means connecting each of said pump means with a separate fluid source and with the inlet port of its respective pump means, said first means including actuating means for each of said pump means, a mixing chamber, and second means connecting said mixing chamber with an outlet port of each of said pumps, and fluid pressure-responsive control means disposed in said mixing chamber operably-connected with said actuating means to control the latter in response to fluid pressure within said mixing chamber, wherein said pumping means comprises a substantially hollow casing having a pair of opposed closed ends, a divider wall extending transversely of said casing intermediate said ends and dividing said casing into first and second pumping chambers, a piston rod mounted for reciprocation transversely of said divider wall and a piston fixedly-secured to each end of said rod and disposed, respectively, within one of said pumping chambers for reciprocation therein, first and second fluid inlet-outlet passage means extending transversely through said casing and opening at one of the respective ends into said first pumping chamber on opposite sides of its associated piston and at their other respective ends exteriorly of said casing, and third and fourth fluid inlet-outlet passage means extending transversely through said casing and opening at one of their respective ends into said second pumping chamber on opposite sides of said piston disposed therein and at their other respective ends exteriorly of said casing.

6. Means for admixing fluids as defined in claim 5 wherein said actuating means comprises a plurality of valve means, one of said valve means including a first valve housing and a first plug movable with respect thereto, said first valve housing having a first fluid inlet port, a first fluid outlet port and a common fluid inlet-outlet port formed therein, said first valve plug having a fluid passage movable into and out of communication with said first inlet and common ports in a first position of said first valve plug, said first valve plug having a second passage formed therein and movable into and out of communication with said outlet and common ports when said first valve plug is in a second position, said passages alternately establishing communication with their respective ports as said first plug is moved alternately and sequentially to its first and second positions, second valve means including the second valve housing and a valve plug therefor movable with respect thereto, said second valve housing having fluid inlet and outlet ports, respectively, said second valve plug having a continuous passage extending therethrough and movable in one position relative to said second valve housing to establish communication between its inlet and outlet ports, said second valve plug being movable to a second position out of communication with said inlet and outlet ports of said second valve housing, said first and second valve plugs being movable simultaneously from their respective first to the respective second positions, respectively, and vice versa, and said first connecting means including conduit means connecting said inlet ports of said first and second valve means with a source of fluid under pressure, conduit means connecting said common inlet and outlet port of said first valve means with said first fluid inlet-outlet passage of said pump means casing, and conduit means connecting said outlet port of said second valve means with said second fluid inlet-outlet passage of said pumping means casing.

7. Means for admixing fluids as defined in claim 6 wherein said second connecting means includes conduit means having one of its ends connected to said last-named conduit and the other end thereof in open communication with said mixing chamber, said last-named conduit means having a constriction formed therein restricting the flow of fluid therethrough, conduit means having one of its ends connected to said last-named conduit and its other end opening into said mixing chamber, said last-named conduit means having a constriction formed therein to restrict the flow of said fluid therethrough, and conduit means having one of its ends connected with said third fluid passage means of said pumping casing.

8. Means for admixing fluids as defined in claim 7 and conduit means connecting said fourth fluid passage means of said pumping casing with a second source of fluid.

9. Means for admixing fluids as defined in claim 8 wherein said mixing chamber includes a substantially hollow closed housing, and means venting said last-named housing to the atmosphere.

References Cited

UNITED STATES PATENTS

| | | | |
|---|---|---|---|
| 2,314,421 | 3/1943 | Peterson | 137—394 |
| 3,161,203 | 12/1964 | Hathorn et al. | 137—101.25 |
| 3,211,166 | 10/1965 | White | 137—99 |
| 3,213,873 | 10/1965 | Cordis | 137—512.3 |

WALTER A. SCHEEL, *Primary Examiner.*

ROBERT W. JENKINS, *Examiner.*